Patented Mar. 6, 1945

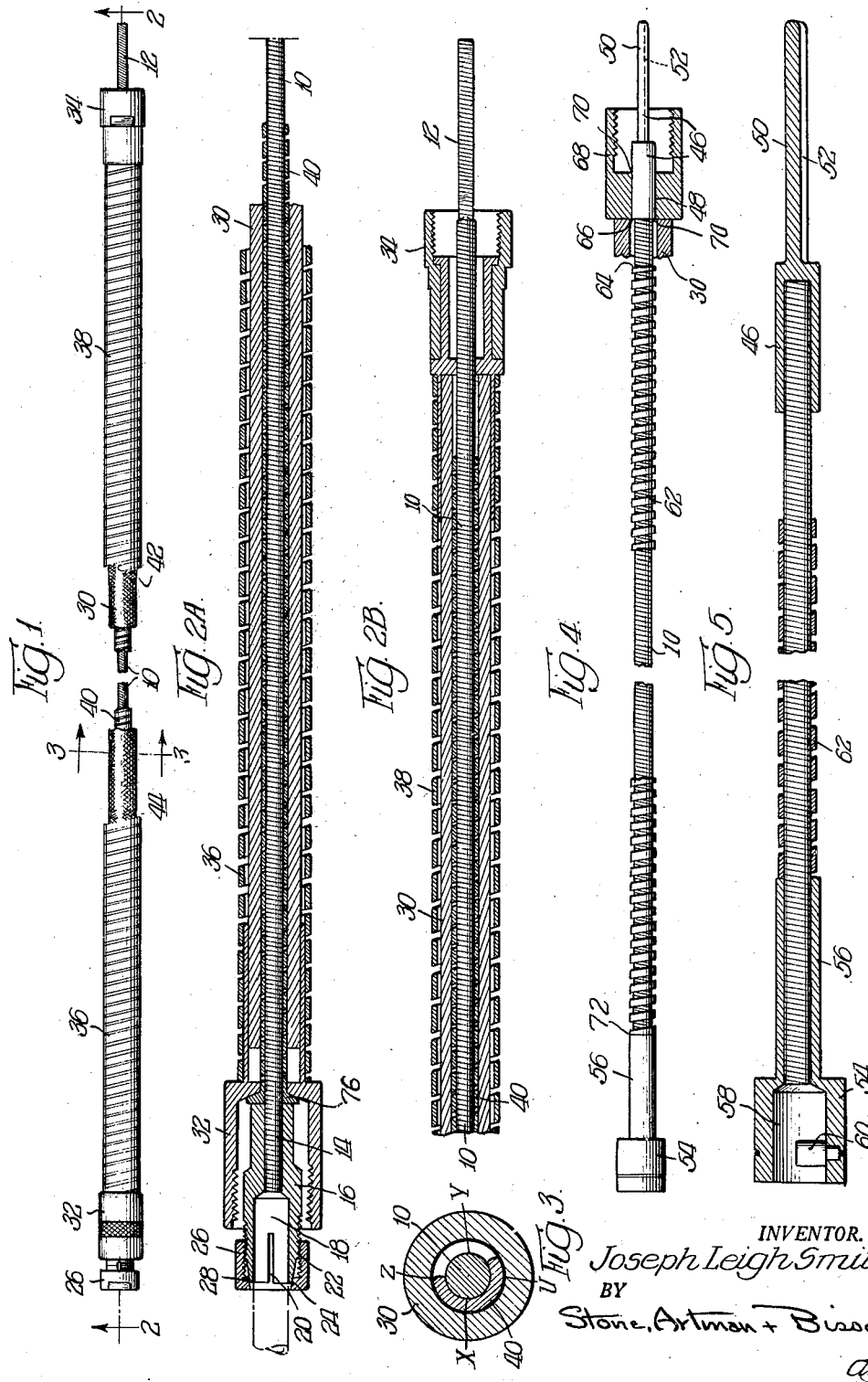

2,370,884

UNITED STATES PATENT OFFICE 2,370,884

FLEXIBLE SHAFT

Joseph Leigh Smith, Glen Ellyn, Ill.

Application August 5, 1943, Serial No. 497,440

9 Claims. (Cl. 64—2)

This invention relates to flexible shafts and particularly to a freely rotatable inter-liner or helix positioned between the casing and the drive core, which inter-liner and drive core may be sold as a replacement unit for flexible shafts having sound casings.

A large number of grinding operations can be performed more rapidly and efficiently with the tool rotating at speeds up to 20,000 R. P. M. than at substantially slower speeds. Although this has long been known, such speeds have not been common because the work commonly necessitated the use of a flexible shaft and in use maximum speeds for these shafts have been much closer to 5,000 R. P. M. than 20,000 R. P. M. Where the higher speeds have been used, however, the shafts have had very short life. The speed limitation, of these or alternatively, short life flexible shafts is attributable to friction between the drive core and the inside wall of the casing when such shafts are bent on fairly short radii. Thus, in existing shafts, bending the shaft to a one hundred and eighty degree arc on a radius approaching the smallest that the core will take may cut the speed down from 20,000 R. P. M. to 4,000 or 5,000 R. P. M. The shaft becomes very hot, the lubricant ceases to be evenly distributed throughout its length, and excessive wear occurs at those points where the drive core presses against the inside of the casing.

Attempts to provide a flexible shaft that would not greatly decelerate when bent sharply are numerous. Particularly, many have utilized a casing having an inside diameter substantially greater than the outside diameter of the core so as to provide an annular cylindrical space therebetween and have positioned at intervals therealong bearing assemblies of various degrees of complexity. These bearing assemblies complicate the lubricating problem which already is commonly a difficult one with flexible shafts because the spiral surface of the core tends to force the lubricant out through the tool holder end of the shaft.

The objects of this invention are to provide a flexible shaft that does not show marked deceleration when bent in an arc on a radius small for the particular core in question; to thereby prolong the life of the shaft; to eliminate much friction under such operating conditions; to evenly distribute lubricant along the shaft under such conditions; and to accomplish these ends by means of a comparatively simple structure.

The feature that attains these objects consists of a helix positioned around the drive core and in length coextensive with the bendable portion of the flexible shaft, which helix is free to rotate or stand still irrespective of rotation of the core. The manner in which the inter-liner or floating helix or sleeve, as it is variously called, functions is not clear. Experiment shows that when a flexible shaft is lying substantially straight and its core is turning at high speed, the floating shaft rotates slowly in the direction of the turning core. The more lubricant inside the casing, the denser the lubricant and the greater increased capacity of the surface of the rotating core to affect movement in the lubricant, the greater is the tendency of the floating core to remain steady, for the direction of winding of the floating helix is opposite to the direction of winding of the surface layer of the flexible core with the result that the sleeve tends to force the lubricant backwardly toward the source of power and the lubricant tends to stop the sleeve from rotating with the core. When the flexible shaft is bent, the floating helix picks up speed in the direction of rotation of the core and this speed of the helix increases with the sharpness of the curvature of the flexible shaft.

Additionally, in connection with his improved flexible shaft, applicant has provided two new features in couplings. It has been common practice heretofore to swedge to a square cross section the driving end of the core of a flexible shaft and this square end is fitted into the tool holder. Applicant provides a separate stud or pintle having a key slot which he squeeze fits over the end of the core. This pintle has a definite breaking point substantially below the breaking point of the spiral core, which results in a great advantage under the following circumstances. During grinding operations at high speeds, a workman will frequently get the stone locked in the workpiece. This places a greater strain on the motor, flexible shaft and grinding tool than they will stand and something must break. In existing tools, this break usually results in the unravelling of the helically wound core. When this occurs the core is ruined and in the unwinding process, it frequently tears the inner wall of the casing to such an extent that it is no longer usable. In the case of applicant's pintle, however, it breaks clean, leaving the core and the casing in perfect condition. Instead of discarding the entire flexible shaft, all that has to be done is remove the broken end of the pintle from the core and install a new one.

Another improvement in applicant's flexible shaft is the employment of a collet chuck as the coupling means at the end of the core of a flexible shaft. This greatly facilitates hooking up the flexible shaft to the source of power or the tool.

These and such other objects as may hereinafter appear are attained in the two embodiments of the invention disclosed in the accompanying drawing wherein:

Figures 1, 2a and 2b are respectively a side elevation and enlarged cross sections on the line 2—2 of Figure 1 of the first embodiment of the invention;

Figure 3 is a sectional view of the first embodiment taken on the line 3—3 of Figure 1; and Figures 4 and 5 are a side elevation and enlarged cross section respectively of the second embodiment.

Continuing to refer to the drawing, more particularly to Figure 1, the numeral 10 identifies a core having a surface layer consisting of a helix wound clockwise when viewed from the left. This core is conventional. The end 12 of the core 10 has been swedged to a square cross section, which is likewise conventional. The other end 14 carries a coupling member 16 tightly fitted to the core. This coupling member has a cylindrical recess 18 with a plurality of slots 20 cut back from the end and has its exterior wall threaded at 22 and tapered at 24 to receive a collar 26 having threads on its inside wall and a cone compressing shoulder 28 adapted to engage the tapered end 24 of the couplings 16. By tightening the collar 26, the walls of the cylindrical recess 18 will grip the shank of a tool or the like. This arrangement greatly simplifies the assembling of the drive core with the source of power.

The casing of this flexible shaft consists in a fabric layer 30 which is conventional and which carries at either end coupling members 32 and 34. The exterior metal helices 36 and 38 do not extend the full length of the flexible shaft but are merely stiffening end members adjacent the couplings to limit the bending of those portions of the flexible shaft adjacent the couplings.

Referring to Figure 3, the core 10 is spaced from the inside wall of the casing 30 by means of a helix 40. This helix substantially occupies the space between the core 10 and the casing 30. It hugs the core 10 so closely that the clearance does not exceed one one-hundredth of an inch, which is the distance indicated by combining $x$ and $y$ in Figure 3. The distance between the outer surface of the helix 40 and the inside of the casing 30 is substantially greater. The combination of $u$ and $z$ might equal as much as one-sixteenth of an inch. These clearances are not critical so far as substantial performance of the flexible shaft is concerned. It has been found that these clearances give improved performance over a helix whose walls are spaced equidistant from the core 10 and the inside of the casing 30.

The helices used by applicant are formed of flat strip, the width being five or six times the thickness. The angle of the helix is such that the distance between each winding does not exceed the width of the winding. This is illustrated in the second embodiment shown in Figures 4 and 5. The spacing between the windings need not be so great, however, because a very successful floating sleeve having a spacing between the windings equal to approximately the thickness of the steel in the floating sleeve is very commonly used. It will be appreciated that there must be sufficient spacing between the windings of the helical sleeve to permit the requisite bending of the flexible shaft. The abutting walls of any two windings of the sleeve are parallel to each other.

As for the length of the inter-liner or floating sleeve with respect to the flexible shaft as a whole, applicant intends that the floating sleeve shall be coextensive with that portion of the flexible shaft which is intended to be bent. Thus, referring to Figure 1, the flexible shaft is intended to be flexed primarily between the points 42 and 44 because the outside reinforcing helices 36 and 38 are intended to limit bending of the shaft within their lengths. It would be possible to mount applicant's floating helix just between the points 42 and 44 because bending of the flexible shaft will ordinarily occur between those two points. In practice, however, applicant provides the entire length of the drive core between the end couplings with a floating helix. Thus, referring to Figure 4, the drive core carries a pintle or stem member 46 having an enlarged bearing portion 48 and a reduced end 50 with a key slot 52 therein. The other end of the core carries a socket coupling 54 having a bearing portion 56 similar to the bearing portion 48. Inside the coupling 54 is a recess 58 with a drive pin 60 for engagement with some sort of stud on the end of a motor shaft or the like. The outside diameters of the bearing portions 48 and 56 approximate the inside diameter of the casing 30. Between the two shoulders of the bearing portions 48 and 56 is positioned a floating helix 62. The helix 62 is slightly shorter leaving a space between the points 64 and 66 so that the helix can move longitudinally of the core. The helix may expand the full length of the core under the influence of the action of oil but being wound in the direction opposite to the winding of the surface of the core, there is a tendency for the oil to keep the floating helix 62 fully extended between the bearing portions 48 and 56 during operation and for the floating helix 62 to assist in pulling the oil back from the tool end toward the drive end.

The embodiment shown in Figures 4 and 5 differs from the embodiment shown in Figures 1 through 3 primarily in the coupling members. It must be understood that in order to replace a core in a sound casing it is necessary to pull the core out one end of the casing. Ordinarily the coupling member on the core adjacent to the source of power is of a size that does not permit its being pushed through the casing. Consequently one has the conventional reduced end of a casing 12 shown in Figure 1. Applicant's pintle 46 constitutes an improvement over this reduced end but it requires an end coupling 68 which has an opening 70 of approximately the inside diameter of the casing. The bearing member 46 rides in the opening 70 and assists in centering the core with respect to the casing at that point.

The advantage of applicant's pintle over the swedged end 12 of the conventional core shown in Figure 1 resides in the fact that on an abrupt stop of the tool caused by jamming the tool in the workpiece, the pintle will make a clean break whereas under similar circumstances, the core end 12 will commence to unravel the core. A flexible shaft core is ordinarily formed of a series of layers of reversely spiraled helices, each layer tightly wound on the layer beneath it.

Once these layers have commenced to unravel, they become useless in a given length of flexible shaft and in loosening frequently tear up the inside wall of the casing.

In the embodiment shown in Figure 4, the floating sleeve or helix 62 is free to move longitudinally of the core 30 between the point 72 which is the shoulder on the bearing 56 and the point 66 which is the shoulder on the bearing 48 by the distance between the point 64 and the point 66. This should be contrasted with the construction shown in the first embodiment of the invention, where, referring to Figures 2a and 2b, the helix is shown to be a continuation of the collar 76 which collar tends to hold the floating helix 40 from moving lengthwise of the core 10. The left-hand end of the floating sleeve 40 is rigidly fastened to the collar 76.

Having thus described my invention, what I claim as new and desire to claim by United States Letters Patent is:

1. A flexible shaft comprising a casing, a drive core within said casing, and around said drive core, a floating sleeve having a length substantially coextensive with the bendable portion of said drive core, the outer and inner surfaces of said sleeve being substantially in cylindrical surfaces when the core is straight and spaced from the casing and drive core respectively so as to permit free rotation of the sleeve with respect to either the casing or the core, whereby when the flexible shaft is bent during rotation friction between the casing, sleeve and core is distributed among a large number of constantly changing points of contact.

2. A flexible shaft comprising a casing, a drive core within said casing, and around said drive core a floating helix having a length substantially coextensive with the bendable portion of said drive core, the outer and inner surfaces of said helix being substantially in cylindrical surfaces when the core is straight and spaced from the casing and drive core respectively so as to permit free rotation of the helix with respect to either the casing or the core whereby when the flexible shaft is bent during rotation friction between the casing, helix and core is distributed among a large number of constantly changing points of contact.

3. A flexible shaft comprising a casing, a drive core within said casing, around said drive core a floating helix having a length substantially coextensive with the bendable portion of the flexible shaft, the outer and inner surfaces of said helix being substantially in cylindrical surfaces when the core is straight and the windings being spaced from each other so as not to interfere with free bending of the flexible shaft, whereby when the flexible shaft is bent during rotation friction between the casing, helix and core is distributed among a large number of constantly changing points of contact.

4. A flexible shaft comprising a casing, a drive core having a spirally wound helix as its surface layer positioned within said casing, and a floating helix around said drive core, said floating helix having its windings reversely spiraled to the windings of the core helix and being characterized by free rotability with respect to either the core or the casing and being of a length substantially coextensive with the length of the bendable portion of the flexible shaft.

5. A flexible shaft comprising a casing, a drive core within said casing, and a flat strip of material spirally wound around said core so that the spacing between each winding thereof is less than the width of the material of the strip, said spirally wound strip having a length substantially coextensive with the length of the bendable portion of the flexible shaft, the outer and inner surfaces of said spirally wound flat strip being substantially in cylindrical surfaces when the flexible shaft is straight and spaced from the casing and drive core respectively so as to permit free rotation thereof with respect to either the casing or the core.

6. A flexible shaft comprising a casing, a coupling member positioned at one end of the casing, an axial opening equal to the inside diameter of the casing in said coupling, a drive core having a diameter somewhat less than the inside diameter of the casing and positioned therein and through the coupling opening, a spirally wound floating helix around said core substantially filling the annular space between the core and the inside of the casing, and a collar seated in the outer opening of the coupling and fastened to the spirally wound sleeve whereby the floating helix will remain in substantially fixed longitudinal position with respect to the flexible shaft.

7. A flexible shaft comprising a casing, a drive core within said casing, a freely rotatable helix around said drive core and substantially occupying the annular space between the drive core and the inside wall of the casing, the outer and inner surfaces of said helix being substantially in cylindrical surfaces when the flexible shaft is straight, a coupling member at each end of the casing, an opening centrally of the coupling member of a size substantially equal to the inside diameter of the casing, and a pintle on the driven end of the drive core, said pintle having a bearing portion adapted to fit into the opening in the coupling, whereby the core can be inserted or withdrawn from the casing from the drive end.

8. As a replacement part for a flexible shaft having a casing and end coupling members, a flexible driving core having therearound a helix, said helix having its outer and inner surfaces substantially in cylindrical surfaces and having a length substantially coextensive with that of the driving core and freely rotatable with respect to the core.

9. As a replacement part for a flexible shaft having a casing and end coupling members, a flexible driving core having a collar at each end and a freely rotatable helix therearound, said helix having its outer and inner surfaces substantially in cylindrical surfaces and having a length substantially coextensive with that of the driving core and freely rotatable with respect to the core.

JOSEPH LEIGH SMITH.